United States Patent [19]

Pichler

[11] Patent Number: 4,715,740
[45] Date of Patent: Dec. 29, 1987

[54] CLOSURE SYSTEM FOR A LONGITUDINALLY DIVIDED CABLE SLEEVE

[75] Inventor: Klaus Pichler, Otterfing, Fed. Rep. of Germany

[73] Assignee: Siemens Aktiengesellschaft, Berlin and Munich, Fed. Rep. of Germany

[21] Appl. No.: 924,978

[22] Filed: Oct. 30, 1986

[30] Foreign Application Priority Data

Nov. 28, 1985 [DE] Fed. Rep. of Germany ....... 3542153

[51] Int. Cl.$^4$ ............................................. F16G 11/02
[52] U.S. Cl. .................................... 403/313; 403/316; 24/25; 174/92
[58] Field of Search ............... 403/341, 338, 313, 316; 24/25; 285/421; 174/92

[56] References Cited

U.S. PATENT DOCUMENTS 3,300,825  1/1967  Andreasen ........................ 24/25 X
4,087,190  5/1978  Haeder ............................. 24/25 X

FOREIGN PATENT DOCUMENTS 421634  4/1926  Fed. Rep. of Germany .......... 24/25

Primary Examiner—Andrew V. Kundrat
Attorney, Agent, or Firm—Hill, Van Santen, Steadman & Simpson

[57] ABSTRACT

The invention is directed to a closure system for closing a longitudinally divided cable sleeve having wedge-shaped beads along a parting line and having wedge-shaped clamp rails. One of the rails has a mutual guide element in the form of a resilient strip which is received in the guide channel formed in the other rail and the strip and guide channel have coacting latching elements to hold the rails in a final clamping position. Preferably, at least one of the rails is provided with pegs or abutments which are provided to aid in moving the rails into the closing position on the beads with a simple lever-like tool.

14 Claims, 7 Drawing Figures

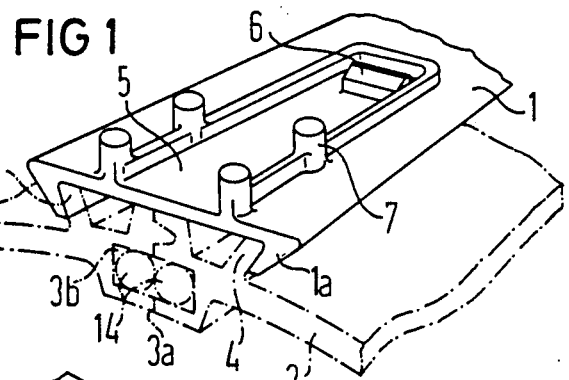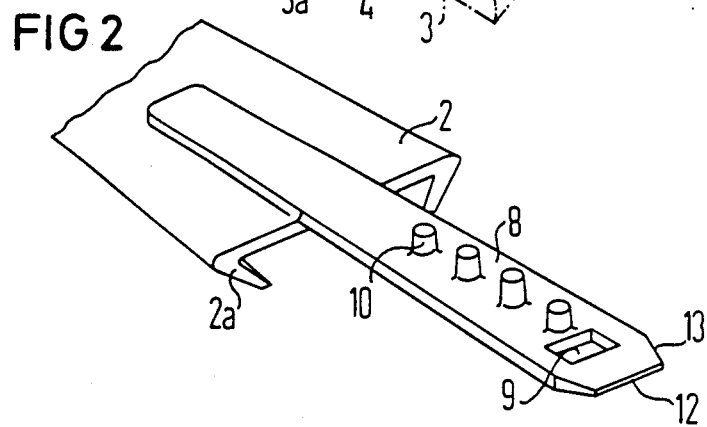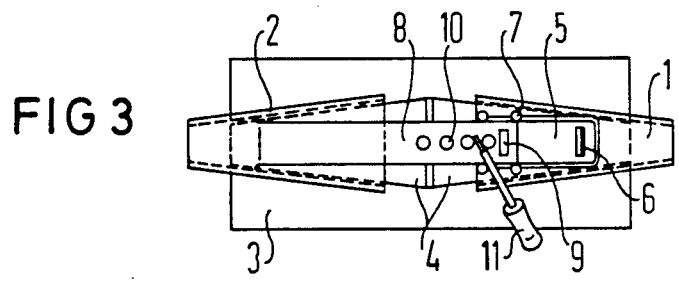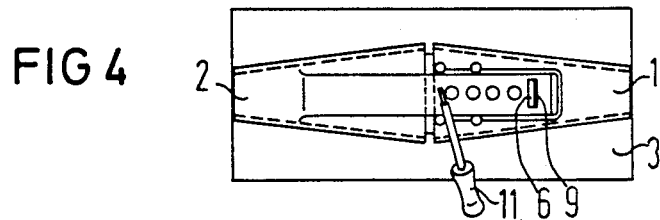

4,715,740

CLOSURE SYSTEM FOR A LONGITUDINALLY DIVIDED CABLE SLEEVE

BACKGROUND OF THE INVENTION

The present invention is directed to a closure system for a longitudinally divided cable sleeve of plastic material, said cable sleeve having a rib or flange extending along each side of a parting line of the sleeve with each of the ribs or flanges having a wedge-shaped configuration diverging from the ends of the sleeve towards the middle, and a pair of wedge-shaped clamping rails being positioned on the flanges to hold the flanges in sealing relationship, said wedge-shaped clamping rails having an arrangement extending therebetween to hold them in a clamping position on the flanges.

Clamping rails having means for holding them into a clamping position on flanges of a longitudinally divided or split cable sleeve are disclosed in U.S. Pat. No. 4,087,190, whose disclosure is incorporated by reference and which was based on German Utility Model 76 22 440. However, in this arrangement the clamping rails were applied to the wedge-shaped beads or flanges with special tools or by means of impact. A securing or fixing in the final position to safeguard against sliding from the final position occurred with the assistance of a holding arrangement comprising a fastening or tightening strap which was introduced through embossed openings on each of the rails and then placed in tension relative to one another. A suitable clamping tool is required for installing this strap. Moreover, a number of work steps, such as drawing the clamp rails onto the wedge-shaped flanges, introducing a tightening strap, application of a clamping tool and finally, fixing of the tightening strap must be carried out. The opening of the cable sleeve was executed in the reverse sequence requiring loosening of the tightening strap, followed by its removal and then forcing the two clamp rails away from each other

SUMMARY OF THE INVENTION

The object of the present invention is to create a closure system wherein fewer individual parts and as a result thereof fewer assembly tasks are required so that the assembly-friendliness of the device is improved overall.

The objects are achieved in an improvement in a closure system for a longitudinally divided cable sleeve of plastic material, said sleeve having two undercut beads extending along the parting line which beads are expanded wedge-like from the sleeve ends towards the middle of the sleeve and wedge-shaped clamping rails with securing means engaging behind said beads. The improvements are one of the pair of clamping rails having a resilient strip extending in a longitudinal direction from its broad end, said strip having a first part for a latch mechanism at its end for securing of the fixing means, and the second opposite clamping rail comprising a longitudinally proceeding guide channel for receiving the resilient strip of the first rail and having a second part of the latch mechanism being arranged at the end of the guide channel.

The advantages of the closure system of the invention are that both clamping rails are already in mutual guidance when drawn on as a result of the resilient strip and guide channel without auxiliary elements having to be mounted. At the end of the drawing on procedure, the two rails are then automatically locked with the integrated latch mechanism so that no additional manipulations are required in this work phase. In addition, the drawing on operation itself can be greatly simplified by the use of providing firmly integrated auxiliary elements on the clamping rails which make it possible for the two clamping rails to be drawn on with simple ordinary tools, for example, an ordinary screwdriver.

Other objects and advantages of the invention will be readily apparent from the following figures, description and claims.

BRIEF DESCRIPTION OF THE DRAWINGS

FIG. 1 is a perspective view of one of the clamping rails of the closure system positioned on the closure flanges of the sleeve in accordance with the present invention;

FIG. 2 is a partial perspective veiw of the other clamping rail having a resilient strip;

FIG. 3 is a plan view illustrating the mounting procedure during an initial phase;

FIG. 4 is a plan view similar to FIG. 3 illustrating the finishing mounting steps for the two clamping rails;

DESCRIPTION OF THE PREFERRED EMBODIMENTS

Figure 5:
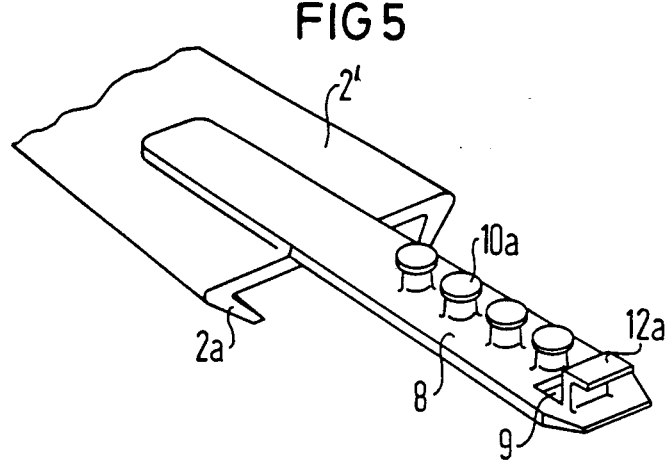
FIG. 5 is a partial perspective view of an embodiment of one of the clamping rails in accordance with the present invention.

The principles of the present invention are particularly useful in a closure system for closing a longitudinally divided cable or sealing sleeve 3 illustrated in the drawings. The sealing elements in the form of a sealing cord or strip 14 are inserted in sealing grooves 3a along a longitudinal slot 3a of the divided cable sleeve 3. The sleeve also has two beads or flanges 4 on each side of the slot 3a which are fashioned wedge-like, as best illustrated in FIGS. 3 and 4, and diverge laterally from each end of the sleeve 3 towards the middle of the sleeve. Thus, the flanges or beads 4 form wedge-shaped configurations as illustrated in the FIGS.

The closure system includes a wedge-shaped clamp or clamping rail 1 and a wedge-shaped clamping or clamp rail 2. As best illustrated in FIGS. 3 and 4, each of the clamp rails 1 and 2 have a wedge shape corresponding to the wedge-shape of the beads 4. The rails 1, as illustrated in FIG. 1, have inwardly directed legs 1a while the rails 2 have inwardly directed legs 2a which will grip the outer edges of the beads 4 as illustrated in FIG. 1. Thus, as the rails 1 and 2 are forced from the position illustrated in FIG. 3 to the position illustrated in FIG. 4, they will force the beads 4 into close sealing engagement. To hold the rails 1 and 2 in the final position, the latching elements 6 and 9 are present.

As illustrated in FIG. 1, one of the rails, such as the rail 1, has a guide channel 5 into which a resilient strip 8 of the other clamp rail 2 will be guided. One of the latching elements 6 is a latch cam or projection which is arranged at the end of the guide channel 5 and serves the purpose of locking or engaging a second latch element on the other rail 2. Adjacent the guide channel 5 are upstanding abuttments in the forms of pegs, which are arranged on both sides of the channel. These abuttments 7 will cooperate with pegs or projections 10 on the resilient strip 8 of the other rail 2 and serve for the mutual urging of the two rails into the final finished and completed position with simple ordinary tools, such as the screwdriver 11 (FIG. 4).

As best illustrated in FIG. 2, the rail 2 at the broad end has a continuating resilient strip 8 which is provided with the pegs or elements 10. At its free end, the resilient strip 8 has a second latching element which is illustrated as an aperture 9 for being received on the latch element 6. In this example, the aperture 9 is slipped over the projection or latch cam 6 to form a fixing or securing of the two rails in the final position. The resilient strip 8 also has lateral bevels 13 which facilitate introduction of the strip into the guide channel 5 and a planar bevel 12 on its lower surface which faces a base of channel 5 and will promote the lifting of the resilient strip 8 with an unlocking tool when the cable sleeve 3 is to opened.

The closing procedure with the closure system of the present invention is best illustrated in FIGS. 3 and 4. As illustrated in FIG. 3, the wedge-shaped rails 1 and 2 are positioned onto the two wedge-shaped beads 4 which extend along the longitudinal edges. These rails are inserted from the ends of the sleeve 3. As illustrated, the left rail 2 already has its resilient strip 8 introduced into the guide channel 5 of the right rail 1. With the assistance of a screwdriver 11, the two rails 1 and 2 are now moved towards each other by the screwdriver 11 extending between one of the posts 7 and one of the pegs 10. With a movement of the screwdriver 11 in a clockwise direction, the two rails will be drawn towards each other. It should be noted, that the screwdriver acts as a lever and does not necessarily need to be a screwdriver but can be any tool, such as an ordinary rod or the like. With the appropriate lever motion or pivoting of the tool, the two rails can be moved relative to one another so that the required closure pressure on the sealing system is reached after mutual engagement.

As illustrated in FIG. 4, during the final stage of closing, the two rails 1 and 2 are in their final position and the latch elements 6 and 9 engaged together to secure the rails against slipping off or from this position. When one wishes to open the cable sleeve again, the two rails 1 and 2 are unlocked from one another likewise with a simple tool by lifting the bevelled end 12 of the strip 8 and then the rails are loosened by means of an opposite lever action until they can be removed without difficulty.

As illustrated in FIG. 5, an embodiment of the rail 2' has the strip 8 with mushroom-shaped pegs 10a. These mushroom-shaped or headed pegs 10a provide an antislip means for the lever tool during the levering procedure. Thus, for example, round rods can also be used as a lever tool now since there is no risk of slipping off of the end of the peg. In addition, at the end of the strip 8 next to the latch element 10, an angle 12a is provided as an unlocking mechanism so that there is no longer a need to engage a tool under the end of the strip 8 for unlocking it in this embodiment.

Figure 6:
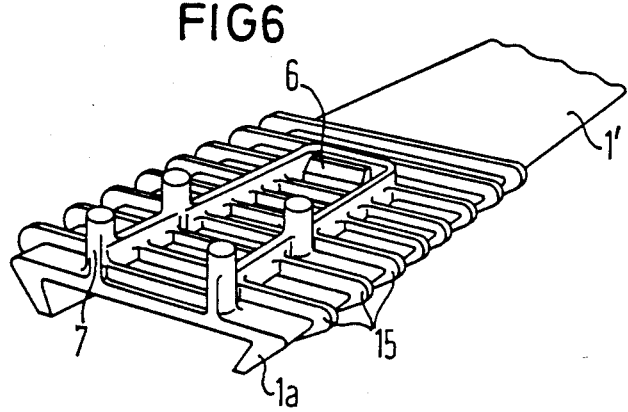
FIG. 6 is a partial perspective view of another embodiment of a clamping rail in accordance with the present invention.

In another embodiment, an especially twist-resistant rail is provided by the rail 1' of FIG. 6. The rail 1' is provided with cross-ribs 15 which lend the rail greater stiffness. These cross ribs 15 are particularly provided given clamp rails composed of plastic. This ribbing can occur partially along the length of the rail or be distributed over various intervals or can also be distributed over the entire surface dependant on the length, the material and the required forces.

The plurality of drawn on aids in the form of pegs and abuttments, such as the pegs 10 or 10a and abuttments 7, are not basically perscribed, but their spacing must be matched to one another in a corresponding fashion so that the beginning as well as the end of the drawing on operation can be comfortably and reliably carried out. On principle, it is only sufficient for the one rail to have only a single draw on aid but for the other to have a plurality of draw on aids lying in series following one another.

As mentioned hereinabove, the rails, such as 1', can be composed of plastic which may be provided with reinforcing inserts, such as fiber glass. In this case, the strip 8 is an integral plastic strip extending from the wide or widened end of the rail, such as 2. In another embodiment, the rails 1 and 2 can be formed of a corrosion proof metal and the strip 8 can be a sheet or strip of spring metal which is secured to an upper surface of the rail 2.

Figure 7:
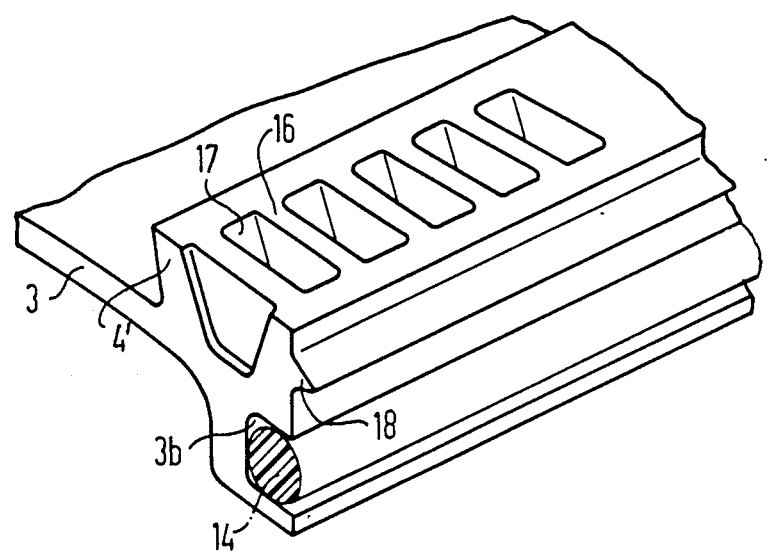
FIG. 7 is a partial perspective view of an embodiment of the bead or flange of a sealing sleeve in accordance with the present invention.

In FIG. 7, an embodiment of the bead is illustrated as the bead 4' for a cable sleeve 3. In this embodiment, the bead 4' has a longitudinally extending sealing system comprising the sealing channel 3b with the inserted cord or element 14 and a longitudinal guidance by means of a spring 18 which is a projecting ridge. To aid in pulling the rails off however, the rib-like fashioning of the undercut bead 4' is also of significance. The releasing of the rail, namely can occur when the two rails are not to be simultaneously released. The bead 4' has a plurality of depressions or recesses 17 forming cross ribs 16. Thus, it is provided that the cross ribs 16 will form abuttments for a simple tool, such as a screwdriver, to be inserted and urge the rail in one direction or the other. This means that the tool is inserted into the respective recess 17 and the rail is pushed off by moving the tool against an edge of the rail as the tip of the tool engages the cross ribs 16. This operation is repeated with the following cross ribs until the rail is freed and can be entirely pulled off. The cross ribs 16 and recesses 17 are therefore, mutually matched with the clamp rail.

Although various minor modifications may be suggested by those versed in the art, it should be understood that I wish to employ within the scope of the patent granted hereon, all such modifications as reasonably and properly come within the scope of my contribution to the art.

I claim:

1. In a closure system for longitudinally closing a divided cable sleeve of plastic, said cable sleeve having two undercut beads extending along a parting line, said beads being expanded wedge-like from the sleeve ends towards the middle of the sleeve and said system including a pair of clamping rails having a wedge-shape and engaged with said beads to hold the beads in tight engagement with means for fixing the clamping rails in a final closed position, the improvements comprising said means for fixing including a resilient strip extending from a broad end of one of the wedge-shaped rails in a longitudinal direction, said strip having a first part for a latch mechanism at its end and having a draw on aid in the form of a plurality of free standing pegs lying at intervals following one another, a second opposed rail having a longitudinally extending guide channel for receiving the resilient strip of said first rail, said guide channel having a second part of the latch mechanism arranged at an end opposite to the wide end.

2. In a closure system according to claim 1, wherein corresponding draw on aids are formed by at least one abuttment aranged on a lateral edge of the guide channel of the second rail.

3. In a closure system according to claim 2, wherein the resilient strip has an aperture as a first part of the latch mechanism and the second part of the latch mechanism in the guide channel comprises an upwardly extending latch cam.

4. In a closure system according to claim 4, wherein at least one of the pegs and abuttment surfaces have an enlarged end.

5. In a closure system according to claim 3, wherein the resilient strip has a lifting bevel on an underneath surface at its free end.

6. In a closure system according to claim 1, wherein the clamping rails have stiffening ribs.

7. In a closure system according to claim 6, wherein the clamping rails are composed of plastic.

8. In a closure system according to claim 7, wherein the plastic of the rails include reinforcing parts particularly glass fibers.

9. In a closure system according to claim 1, wherein each of the rails is composed of a corrosion-resistant metal.

10. In a closure system according to claim 3, which includes a lifting angle on an upper surface of said resilient strip at the free end thereof.

11. In a closure system for longitudinally closing a divided cable sleeve of plastic, said cable sleeve having two undercut beads extending along a parting line, said beads being expanded wedge-like from the sleeve ends towards the middle of the sleeve and said system including a pair of clamping rails having a wedge-shape and engaged with said beads to hold the beads in tight engagement with means for fixing the clamping rails in a final closed position, the improvements comprising at least one of the longitudinally extending beads of the cable sleeve having a plurality of longitudinally spaced recesses on an upper surface forming cross ribs lying therebetween, and said means for fixing including a resilient strip extending from a broad end of one of the wedge-shaped rails in a longitudinal direction, said strip having a first part for a latch mechanism at its end, a second opposed rail having a longitudinally extending guide channel for receiving the resilient strip of said first rail, said guide channel having a second part of the latch mechanism arranged at an end opposite to the wide end.

12. In a closure system for longitudinally closing a divided cable sleeve of plastic, said cable sleeve having two undercut beads extending along a parting line, said beads being expanded wedge-like from the sleeve ends towards the middle of the sleeve and said system including a pair of clamping rails having a wedge-shape and engaged with said beads to hold the beads in tight engagement with means for fixing the clamping rails in a final closed position, the improvements comprising said means for fixing including a resilient strip extending from a broad end of one of the wedge-shaped rails in a longitudinal direction, said strip having a first part for a latch mechanism at its end, said first part being an aperture formed in the end of the strip, a second opposed rail having a longitudinally extending guide channel for receiving the resilient strip of said first rail, said guide channel having a second part of the latch mechanism arranged at an end opposite to the wide end, said second part being an upwardly extending latch projection.

13. In a closure system according to claim 12, wherein the end of the resilient strip has a lifting bevel on a surface facing the guide channel.

14. In a closure system according to claim 12, wherein the end of the resilient strip has a lifting angle on an upper surface at its free end.

* * * * *